United States Patent
Li et al.

(10) Patent No.: US 12,088,537 B2
(45) Date of Patent: Sep. 10, 2024

(54) SCALABLE PHASED-ARRAY SYSTEM FOR WIRELESS SYSTEMS

(71) Applicant: National Taiwan University, Taipei (TW)

(72) Inventors: Chun-Hsing Li, Taipei (TW); Pin-Chun Chiu, Taipei (TW)

(73) Assignee: National Taiwan University, Taipei (TW)

( * ) Notice: Subject to any disclaimer, the term of this patent is extended or adjusted under 35 U.S.C. 154(b) by 282 days.

(21) Appl. No.: 17/697,918

(22) Filed: Mar. 17, 2022

(65) Prior Publication Data
US 2022/0303106 A1 Sep. 22, 2022

Related U.S. Application Data

(60) Provisional application No. 63/162,561, filed on Mar. 18, 2021.

(51) Int. Cl.
*H04B 7/005* (2006.01)
*H01Q 3/30* (2006.01)
*H04B 1/401* (2015.01)
*H04L 5/14* (2006.01)

(52) U.S. Cl.
CPC .............. *H04L 5/1461* (2013.01); *H01Q 3/30* (2013.01); *H04B 1/401* (2013.01)

(58) Field of Classification Search
CPC ..... H04L 5/1461; H04L 5/1469; H04L 29/06; H01Q 3/30; H04B 1/401; H04B 1/50; H04B 1/56; H04W 28/04; H04W 88/06
See application file for complete search history.

(56) References Cited

U.S. PATENT DOCUMENTS

| | | | | | |
|---|---|---|---|---|---|
| 5,590,412 | A | * | 12/1996 | Sawai | H03F 3/72 455/86 |
| 8,078,123 | B2 | * | 12/2011 | Behzad | H04W 88/02 455/114.2 |
| 8,520,576 | B2 | * | 8/2013 | Kim | H04B 7/0413 370/310 |
| 10,498,298 | B1 | * | 12/2019 | Wang | H03F 3/191 |
| 2004/0248529 | A1 | * | 12/2004 | Park | H04W 88/02 455/127.1 |
| 2009/0124214 | A1 | | 5/2009 | Zhang et al. | |
| 2010/0225374 | A1 | | 9/2010 | Forstner et al. | |

(Continued)

*Primary Examiner* — Phuongchau Ba Nguyen

(57) ABSTRACT

A scalable phased-array system for a wireless system includes: a plurality of transceivers, which are switched to form a transmitter mode and a receiver mode by means of time division duplexing (TDD), wherein each transceiver includes: a millimeter wave (mmWave) up-conversion circuit used to convert a baseband (BB) transmitter signal into an intermediate frequency (IF) transmitter signal; a power divider/combiner circuit used to divide the IF transmitter signal into a plurality of pairs of IF transmitter differential signals in the transmitter mode, and combine a plurality of pairs of BB receiver differential signals into a BB receiver signal in the receiver mode; and a beamforming circuit used to convert the pairs of the IF transmitter differential signals into a plurality of radio frequency (RF) transmitter signals in the transmitter mode, and convert a plurality of RF receiver signals into the pairs of the BB receiver differential signals in the receiver mode.

10 Claims, 5 Drawing Sheets

(56) References Cited

U.S. PATENT DOCUMENTS

| | | | |
|---|---|---|---|
| 2014/0079098 A1 | 3/2014 | Harjani et al. | |
| 2014/0308899 A1* | 10/2014 | Chen | H04B 1/0082 |
| | | | 455/42 |
| 2018/0342804 A1* | 11/2018 | Hasegawa | H01Q 3/42 |
| 2020/0067559 A1* | 2/2020 | Wich | H04B 1/44 |
| 2020/0091608 A1* | 3/2020 | Alpman | H01L 23/642 |
| 2023/0163801 A1* | 5/2023 | Wiegner | H04B 1/40 |
| | | | 455/552.1 |

* cited by examiner

SCALABLE PHASED-ARRAY SYSTEM FOR WIRELESS SYSTEMS

TECHNICAL FIELD

The present invention relates to a scalable phased-array system, particularly to a scalable phased-array system for a wireless system.

BACKGROUND

In the presence of lossy phase shifters and limited transistor speeds, for example references [1] and [2], a conventional phased-array architecture cannot be applied to a system with a working frequency greater than 100 GHz.

By using a frequency multiplier can expand the working frequency of a wireless system to be greater than 100 GHz. However, the frequency multiplier is an extremely nonlinear circuit, resulting in signal constellation distortion. In order to support higher order modulation, for example a reference [3], a cubic mixer is used and power of local oscillation (LO) and intermediate frequency (IF) signals is properly adjusted, so that desired signals can be improved to the maximum extent, and undesired spurs are reduced to the maximum extent as well. Nevertheless, the undesired spurs will still cause interference and reduce signal to noise ratio. In addition, the operation cannot adjust the output phase of a transceiver, namely, the phased-array system is not applicable.

For example, in a reference [4], a square mixer can solve the problem of spurs emerging in the cubic mixer. However, the work needs many high frequency drivers to provide acceptable output power, which not only occupies a large chip area, but also consumes a lot of direct current power. Besides, the operation cannot support a phase-shifting function. The operation cannot realize the phased-array system due to large occupied chip area and insufficient phase adjusting capacity.

Reference [1]: "Y. Yin et al., "A 37-42-GHz 8×8 phased-array with 48-51-dBm EIRP, 64-QAM 30-Gb/s data rates, and EVM analysis versus channel RMS errors," *IEEE Trans. Microw. Theory Tech.*, vol. 68, no. 11, pp. 4753-4764, November 2020.". Reference [2]: "L. Gao and G. M. Rebeiz, "A 22-44-GHz phased-array receive beamformer in 45-nm CMOS SOI for 5G applications with 3-3.6-dB NF," *IEEE Trans. Microw. Theory Tech.*, vol. 68, no. 11, pp. 4765-4774, November 2020.". Reference [3]: "K. Katayama et al., "A 300 GHz CMOS transmitter with 32-QAM 17.5 Gb/s/ch capability over six channels," *IEEE J. Solid-State Circuits*, vol. 51, no. 12, pp. 3037-3048, December 2016.". Reference [4]: "S. Lee et al., "An 80-Gb/s 300-GHz-band single-chip CMOS transceiver," *IEEE J. Solid-State Circuits*, vol. 54, no. 12, pp. 3577-3588, December 2019.".

SUMMARY

The present invention provides a scalable phased-array system for a wireless system by time division duplexing (TDD). The provided architecture realizes the phased-array system by means of a frequency multiplier and a low frequency phase shifter. With respect to design of a transmitter (TX), the provided frequency multiplier has frequency multiplying and mixing functions and is used to perform linear up-conversion on a baseband signal to a desired frequency band. High frequency carriers can be generated by low frequency IF and LO signals, so that design of a transceiver is simplified greatly. Phases of the desired signals and phases of the undesired spurs of each TX element can be respectively controlled by the low frequency phase shifter, and the phase resolution of the phase shifter can be kept unvaried in the up-conversion process. Therefore, output power of the desired signals from each TX element can be combined in a space and beams can be output along a target direction. Meanwhile, the undesired spurs are eliminated correspondingly. With respect to design of a receiver (RX), it is of an LO phase-shifting architecture. The desired LO signals with phase adjusting capacity are directly provided by a transmitter circuit. Thus, the phase of each RX of the phased-array system can be adjusted to receive signals from the target direction.

The scalable phased-array system for a wireless system provided by the present invention includes a plurality of transceivers, the plurality of transceivers being arranged in an array way and switched to form a transmitter mode and a receiver mode by means of time division duplexing. Each of the transceivers includes a millimeter wave (mmWave) up-conversion circuit, a power divider/combiner circuit and a beamforming circuit. The millimeter wave up-conversion circuit is used to convert a baseband (BB) transmitter signal into an intermediate frequency (IF) transmitter signal. The power divider/combiner circuit is connected with the millimeter wave up-conversion circuit and is used to divide the IF transmitter signal into a plurality of pairs of IF transmitter differential signals in the transmitter mode, and to combine a plurality of pairs of BB receiver differential signals into a BB receiver signal in the receiver mode. The beamforming circuit is connected with the power divider/combiner circuit and includes a plurality of sub-circuits arranged in an array way, the plurality of sub-circuits being used to convert the plurality of pairs of IF transmitter differential signals into a plurality of radio frequency (RF) transmitter signals in the transmitter mode and convert a plurality of RF receiver signals into the plurality of pairs of BB receiver differential signals in the receiver mode.

In an embodiment of the present invention, each of the sub-circuits includes: an IF signal phase-shifting circuit, a local oscillation signal phase-shifting circuit, a mixed up-conversion circuit, a first mixed circuit, a second mixed circuit, a 90-degree mixed coupled circuit and a pair of in-phase/quadrature-phase mixed circuits. The IF signal phase-shifting circuit is used to phase-shift a pair of IF transmitter differential signals in the transmitter mode so as to output a pair of signals. The local oscillation signal phase-shifting circuit is used to phase-shift a pair of local oscillation signals in the transmitter mode and the receiver mode so as to output a pair of signals. The mixed up-conversion circuit is connected with the IF signal phase-shifting circuit and the local oscillation signal phase-shifting circuit, is used to perform up-conversion, phase-shifting and mixing on the pair of signals output by the IF signal phase-shifting circuit and the pair of signals output by the local oscillation signal phase-shifting circuit in the transmitter mode so as to output a pair of signals, and is used to perform up-conversion, phase-shifting and conversion on the pair of signals output by the local oscillation signal phase-shifting circuit as a pair of common-mode signals in the receiver mode. The first mixed circuit is connected with the mixed up-conversion circuit and is used to subtract the pair of signals output by the mixed up-conversion circuit in the transmitter mode so as to generate a radio frequency transmitter signal. The second mixed circuit is connected with the mixed up-conversion circuit and is used to add the pair of common-mode signals output by the mixed up-conversion circuit in the receiver mode so as to output a pair of signals. The 90-degree mixed coupled circuit is connected with the second mixed circuit and is used to convert the pair of signals output by the second mixed circuit as a pair of orthogonal local oscillation signals in the receiver mode. The pair of in-phase/quadrature-phase mixed circuits is connected with the 90-degree mixed coupled circuit and is used to convert a radio frequency receiver signal into a baseband receiver differential signal pair via the pair of orthogonal local oscillation signals in the receiver mode.

In an embodiment of the present invention, the pair of IF local oscillation differential signals is generated by dividing an IF local oscillation signal by the power divider/combiner circuit, and the IF local oscillation signal is generated by performing up-conversion on a local oscillation input signal by the millimeter wave up-conversion circuit.

In an embodiment of the present invention, the pair of IF local oscillation differential signals is generated by the power divider/combiner circuit.

In an embodiment of the present invention, the pair of IF local oscillation differential signals is generated by a synthesizer.

In an embodiment of the present invention, each of the sub-circuits further includes: an antenna, a single-pole double-throw switch, a power amplifier and a low noise amplifier. The single-pole double-throw switch is connected with the antenna and is used to be switched to form the transmitter mode that transmits the RF transmitter signal via the antenna and the receiver mode that receives the RF receiver signal via the antenna by means of TDD. The power amplifier is connected with the first mixed circuit and the single-pole double-throw switch and is used to amplify the RF transmitter signal. The low noise amplifier is connected with the pair of in-phase/quadrature-phase mixed circuits and the single-pole double-throw switch and is used to amplify the RF receiver signal.

In an embodiment of the present invention, the mixed up-conversion circuit includes: a third pair of mixed circuits, a pair of phase-shifting circuits and a pair of frequency multiplying circuits. The third pair of mixed circuits is connected with the IF signal phase-shifting circuit and the local oscillation signal phase-shifting circuit. The pair of phase-shifting circuits is connected with the third pair of mixed circuits. The pair of frequency multiplying circuits is connected with the pair of phase-shifting circuits.

In an embodiment of the present invention, the IF signal phase-shifting circuit, the local oscillation signal phase-shifting circuit and the pair of phase-shifting circuits are of a resonator-coupled network structure.

In an embodiment of the present invention, the BB transmitter signal includes a pair of in-phase/quadrature-phase BB transmitter signals.

In an embodiment of the present invention, the millimeter wave up-conversion circuit includes a frequency multiplier used to perform up-conversion on the BB transmitter signal into the IF transmitter signal and to perform up-conversion on the local oscillation input signal into the IF local oscillation signal.

The scalable phased-array system for a wireless system provided by the present invention is realized by utilizing the frequency multiplier and the low frequency phase shifter, so that design of the transceiver is simplified greatly. With respect to design of the transmitter (TX), phases of the desired signals and phases of the undesired spurs of each TX element can be respectively controlled by the low frequency phase shifter, and therefore, output power of the desired signals from each TX element can be combined in a space and beams can be output along a target direction. Meanwhile, the undesired spurs are eliminated correspondingly. With respect to design of a receiver (RX), it is of an LO phase-shifting architecture, so that the desired LO signals with phase adjusting capacity are directly provided by a transmitter circuit. Thus, the phase of each RX of the phased-array system can be adjusted to receive signals from the target direction. Besides the provided innovated phased-array system, the present invention further provides a multifunctional resonator-coupled network (RCN). The RCN can realize functions of phase shifting, impedance matching, conversion between balance and imbalance, signal combination and subtraction and the like. Thus, it not only saves the area of the transceiver, but also reduces the power consumption greatly.

In order to make the above and other purposes, features and advantages of the present invention more apparent and understandable, embodiments are specifically listed below, and detailed description is made below in combination with drawings.

DETAILED DESCRIPTION OF EMBODIMENTS

Figure 1:
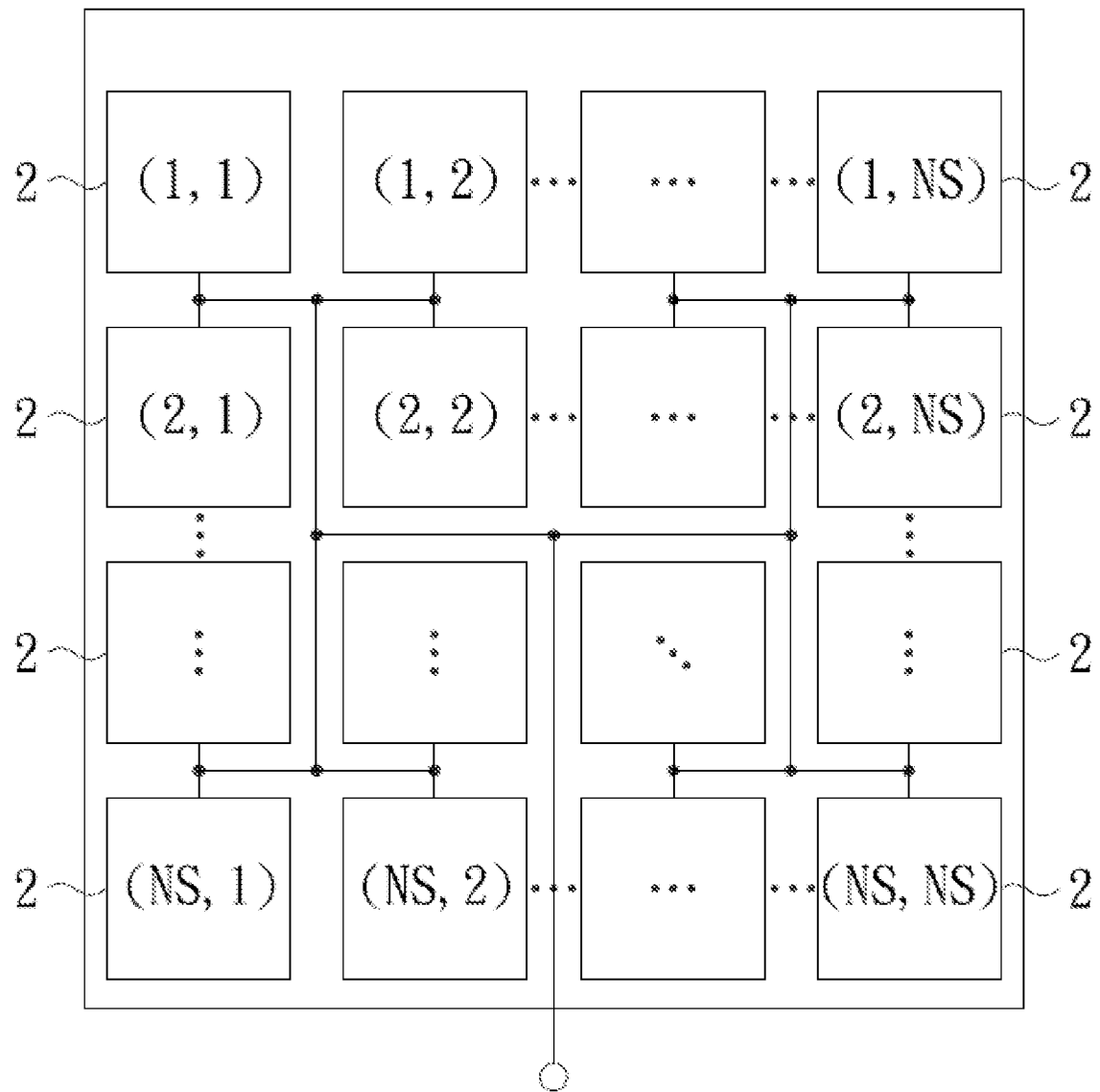
FIG. 1 is a schematic diagram of a scalable phased-array system provided by an embodiment of the present invention.

Referring to FIG. 1, it is a schematic diagram of a scalable phased-array system 1 provided by an embodiment of the present invention. The scalable phased-array system 1 provided by the present invention includes a plurality of transceivers 2, wherein the plurality of transceivers 2 are arranged in an array way. For example, the plurality of transceivers 2 are arranged in an array way of a rectangle: NS*NS, where NS is a positive integer. The plurality of transceivers 2 can transmit/receive BB transmitter signals $BB_{Tx}$, BB receiver signals $BB_{RX}$ and local oscillation input signals $LO_{in}$. The BB transmitter signals $BB_{Tx}$ include a pair of in-phase/quadrature-phase transmitter signals, for example, $BB_{TXI+, NS, NS}$, $BB_{TXI-, NS, NS}$, $BB_{TXQ+, NS, NS}$ and $BB_{TXQ-, NS, NS}$, and the BB receiver signals BBRX include a pair of in-phase/quadrature-phase receiver signals, for example, $BB_{RXI+, NS, NS}$, $BB_{RXI-, NS, NS}$, $BB_{RXQ+, NS, NS}$ and $BB_{RXQ-, NS, NS}$.

The plurality of transceivers 2 in the scalable phased-array system 1 provided by the present invention are switched to the transmitter mode and the receiver mode by way of TDD, and transmission and reception by the transceivers 2 are not performed simultaneously, so that in the receiver mode of the transceivers, a part of circuit for transmitting signals can be a circuit for receiving the signals, and therefore, the design of the transceivers 2 is simplified greatly.

Figure 2:
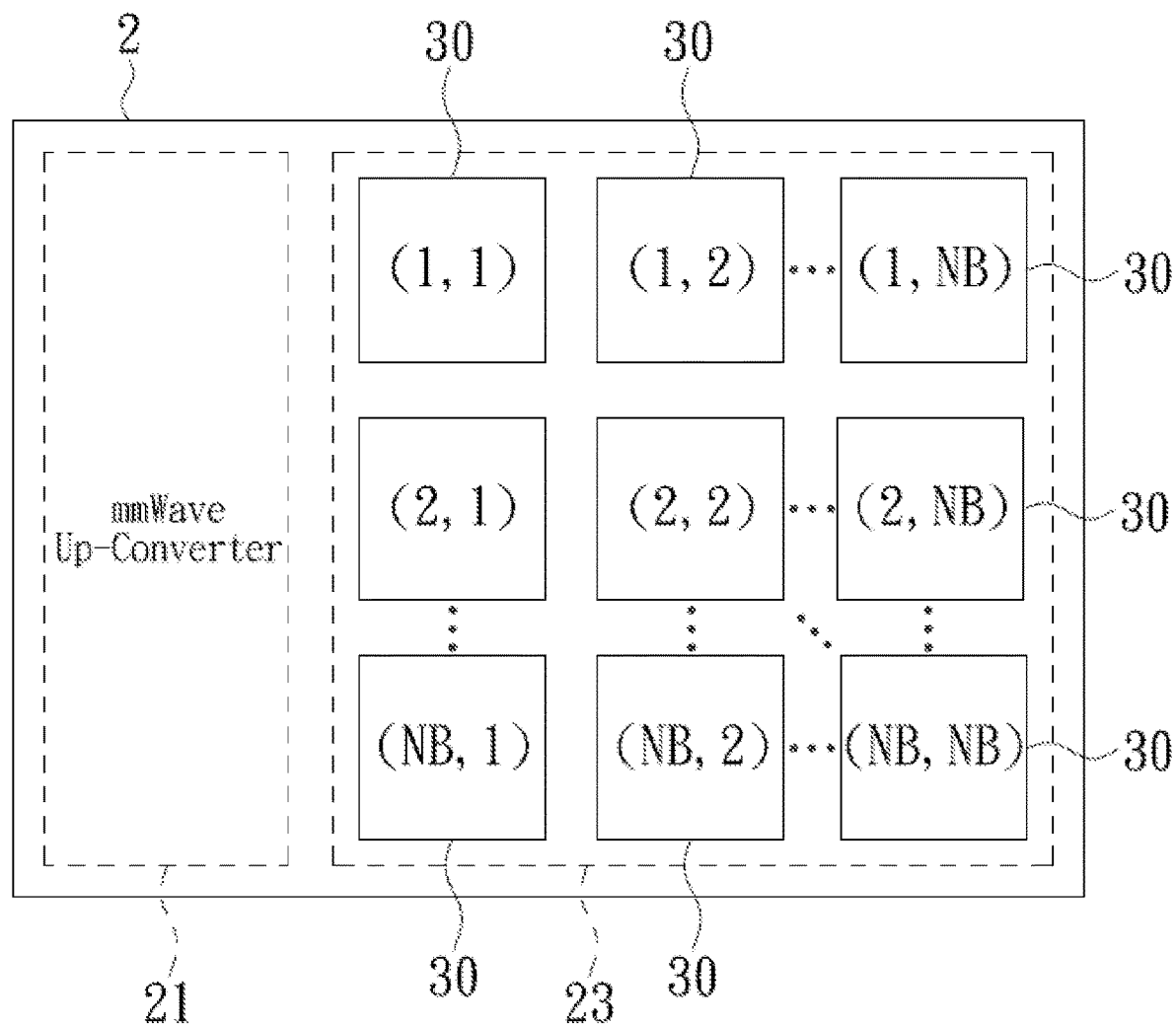
FIG. 2 is a schematic diagram of a transceiver provided by an embodiment of the present invention.
Figure 3:
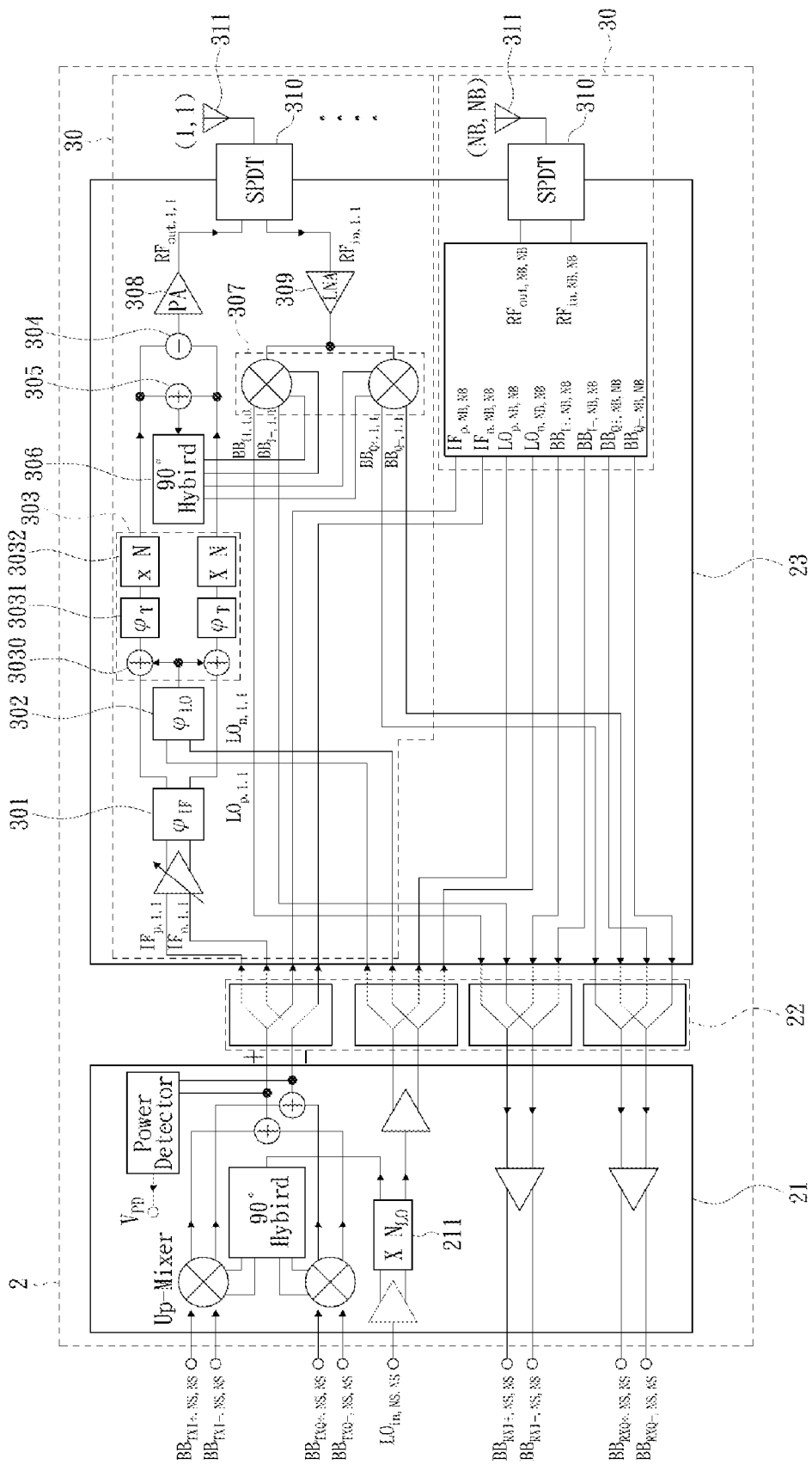
FIG. 3 is a schematic diagram of a circuit layout of a transceiver provided by an embodiment of the present invention.

Referring to FIG. 2 and FIG. 3, they are respectively a schematic diagram and a schematic diagram of a circuit layout of the transceiver 2 provided by an embodiment of the present invention. Each of the transceivers 2 includes a millimeter wave up-conversion circuit (mmWave Up-Converter) 21, a power divider/combiner circuit (Power Divider/Combiner) 22 and a beamforming circuit (Beamformer) 23, wherein the beamforming circuit 23 includes a plurality of sub-circuits 30 arranged in an array way. For example, the plurality of sub-circuits 30 are arranged in an array way of NB*NB, where NB is a positive integer. The power divider/combiner circuit 22 is connected with the millimeter wave up-conversion circuit 21 and each of the sub-circuits 30 in the beamforming circuit 23. Each of the sub-circuits 30 at least includes an IF signal phase-shifting circuit $\varphi_{IF}$301, an LO signal phase-shifting circuit $\varphi_{LO}$302, a mixed up-conversion circuit 303, a first mixed circuit 304, a second mixed circuit 305, a 90-degree mixed coupled circuit 306, a pair of in-phase/quadrature-phase mixed circuits 307, a power amplifier PA308, a low noise amplifier (LNA) 309, a Single-Pole Double-Throw (SPDT) switch 310 and an antenna 311, wherein the mixed up-conversion circuit 303 is connected with the IF signal phase-shifting circuit 301 and the LO signal phase-shifting circuit 302, the first mixed circuit 304 and the second mixed circuit 305 are respectively connected with the mixed up-conversion circuit 303, the 90-degree mixed coupled circuit 306 is connected with the second mixed circuit 305, the pair of in-phase/quadrature-phase mixed circuits 307 is connected with the 90-degree mixed coupled circuit 306, the power amplifier 308 is connected with the first mixed circuit 304, the low noise amplifier 309 is connected with the pair of in-phase/quadrature-phase mixed circuits 307, the SPDT switch 310 is connected with the power amplifier 308 and the low noise amplifier 309, and the antenna 311 is connected with the SPDT switch 310. In addition, the mixed frequency-booting circuit 303 at least includes a pair of third mixed circuits 3030, a pair of phase-shifting circuits $\varphi_T$3031 and a pair of frequency multiplying circuits 3032, wherein the pair of third mixed circuits 3030 is connected with the IF signal phase-shifting circuit 301 and the LO signal phase-shifting circuit 302, the pair of phase-shifting circuits 3031 is connected with the pair of third mixed circuits 3030, and the pair of frequency multiplying circuits 3032 is connected with the pair of phase-shifting circuits 3031.

In the embodiment, when the transceiver 2 is in the transmitter mode, the millimeter wave up-conversion circuit 21 at least includes a frequency multiplier 211 to perform up-conversion on the BB transmitter signal to the IF transmitter signal and perform up-conversion on the LO input signal $LO_{in, NS, NS}$ to the IF oscillation signal. The power divider/combiner circuit 22 is used to divide the IF transmitter signal into a plurality of IF transmitter differential signals such as $IF_{p,1,1}$, $IF_{n,1,1}$, $IF_{p,NB,NB}$ and $IF_{n,NB,NB}$ and to divide the IF LO signal into a plurality of IF LO differential signals such as LO, $LO_{n,1,1}$, $LO_{p,NB,NB}$ and $LO_{n,NB,NB}$. Each of the sub-circuits 30 in the beamforming circuit 23 receives a pair of IF transmitter differential signals and a pair of IF LO differential signals so as to convert the pair of IF transmitter differential signals into a RF transmitter signal such as $RF_{out,1,1}$ and $RF_{out,NB,NB}$. In another embodiment, the IF LO signal and the pair of IF LO differential signals can be directly generated by the power divider/combiner circuit 22. In another embodiment, the IF LO signal and the pair of IF LO differential signals can be generated by an external synthesizer.

In the embodiment, when the transceiver 2 is in the transmitter mode, the IF signal phase-shifting circuit 301 in each of the sub-circuits 30 is used to phase-shift a pair of IF transmitter differential signals so as to output a pair of signals. The LO signal phase-shifting circuit 302 of each of the sub-circuits 30 is used to phase-shift a pair of IF LO differential signals so as to output a pair of signals. The pair of third mixed circuits 3030 in the mixed up-conversion circuit 303 in each of the sub-circuits 30 is used for mixing, the pair of phase-shifting circuits 3031 in the mixed up-conversion circuit 303 in each of the sub-circuits 30 is used for phase-shifting, and the pair of frequency multiplying circuits 3032 in the mixed up-conversion circuit 303 in each of the sub-circuits 30 is used for up-conversion to convert the pair of signals output by the IF signal phase-shifting circuit 301 and the pair of signals output by the LO signal phase-shifting circuit 302 so as to output a pair of signals. The first mixed circuit 304 of each of the sub-circuits 30 is used to subtract the pair of signals output by the mixed up-conversion circuit 303 so as to generate an RF transmitter signal. The power amplifier 308 of each of the sub-circuits 30 is used to amplify the RF transmitter signal. The SPDT switch 310 of each of the sub-circuits 30 is used to be switched to the transmitter mode by way of TDD so as to transmit the RF transmitter signal via the antenna 311.

In an example, it is assumed that the beamforming circuit 23 includes two sub-circuits 30 that are respectively a sub-circuit (1, 1) 30 and a sub-circuit (1, 2) 30. When a pair of IF transmitter differential signals and a pair of IF LO differential signals are input into the sub-circuit (1, 1) 30 of the beamforming circuit 23, the pair of IF transmitter differential signals passes through the IF signal phase-shifting circuit $\varphi_{IF}$301 of the sub-circuit (1, 1) 30 so as to output a pair of signals, and the pair of IF LO differential signals passes through the LO signal phase-shifting circuit $\varphi_{LO}$302 of the sub-circuit (1, 1) 30 so as to output a pair of signals. Then the pair of signals output by the IF signal phase-shifting circuit 301 and the pair of signals output by the LO signal phase-shifting circuit 302 pass through the pair of the third mixed circuits 3030 in the mixed up-conversion circuit 303 of the sub-circuit (1, 1) 30 so as to output pairs of signals $(A_{LO}e^{j\varphi LO,1,1}+A_{IF}e^{j\varphi IF,1,1})$ and $(A_{LO}e^{j\varphi LO,1,1}-A_{IF}e^{j\varphi IF,1,1})$. The other pair of IF transmitter differential signals and the other pair of IF LO differential signals are input into the sub-circuit (1, 2) 30 of the beamforming circuit 23, and then pass through the pair of third mixed circuits 3030 in the mixed up-conversion circuit 303 of the sub-circuit (1, 2) 30 so as to output pairs of signals $(A_{LO}e^{j\varphi LO,1,2}+A_{IF}e^{j\varphi IF,1,2})$ and $(A_{LO}e^{j\varphi LO,1,2}-A_{IF}e^{j\varphi IF,1,2})$, wherein $A_{LO}$ and $A_{IF}$ are respectively amplitudes of the LO signals and the IF signals.

The pair of signals $(A_{LO}e^{j\varphi LO,1,1}+A_{IF}e^{j\varphi IF,1,1})$ and $(A_{LO}e^{j\varphi LO,1,1}-A_{IF}e^{j\varphi IF,1,1})$ output by the pair of third mixed circuits 3030 in the mixed up-conversion circuit 303 of the sub-circuit (1, 1) 30 after passing through the pair of phase-shifting circuits $\varphi_T$3031 and the pair of frequency multiplying circuits 3032 enters the first mixed circuit 304 to be subtracted to generate a RF transmitter signal $RF_{out, 1, 1}$, and the pair of signals $(A_{LO}e^{j\varphi LO,1,2}+A_{IF}e^{j\varphi IF,1,2})$ and $(A_{LO}e^{j\varphi LO,1,2}-A_{IF}e^{j\varphi IF,1,2})$ output by the pair of third mixed circuits 3030 in the mixed up-conversion circuit 303 of the sub-circuit (1, 2) 30 after passing through the pair of phase-shifting circuits $\varphi_T$3031 and the pair of frequency multiplying circuits 3032 enters the first mixed circuit 304 to be subtracted to generate a RF transmitter signal $RF_{out, 1, 2}$, wherein a multiple N of the frequency multiplier 3032 takes 4 as an example, and the RF transmitter signal $RF_{out, 1, 1}$ includes the desired signal $A^3_{LO} A_{IF} CG_{FM}e^{j(\varphi IF,1,1+3\varphi LO,1,1+4\varphi T,1,1)}$ and the undesired spur $A_{LO} A^3_{IF}CG_{FM}e^{j(3\varphi IF,1,1+\varphi LO,1,1+4\varphi T,1,1)}$. The RF transmitter signal $RF_{out_{1,2}}$ includes the desired signal $A^3_{LO} A_{IF} CG_{FM} e^{j(\varphi IF,1,2+3\varphi LO,1,2+4\varphi T,1,2)}$ and the undesired spur $A_{LO} A^3_{IF} CG_{FM} e^{j(3\varphi IF,1,2+\varphi LO,1,2+4\varphi T,1,2)}$, wherein $CG_{FM}$ is a conversion gain of the frequency multiplier 3032. It can be noted that the undesired spurs cannot be inhibited by a filter as a result of same frequency of the RF transmitter signals required thereby. On the contrary, the undesired spurs can be eliminated by designing their phases correctly in the desired phased-array system. The phased-array system provided by the present invention can design values of $\varphi_{LO,NB,NB}$, $(\varphi_{LO,NB,NB+1}, \varphi_{IF,NB,NB}, \varphi_{IF,NB,NB+1}, \varphi_{T,NB,NB}$ and $\varphi_{T,NB,NB+2}$ according to equations (1)-(3) to control output of a phase difference $\Delta\varphi$ of the desired RF transmitter signals, and meanwhile, the undesired spurs between channels of adjacent sub-circuits are eliminated due to an out-phase (the difference between the phases is 180 degrees).

$$\varphi_{T,NB,NB+2} - \varphi_{T,NB,NB} = 2(\Delta\varphi)/N \quad (1)$$

$$\varphi_{IF,NB,NB+1} - \varphi_{IF,NB,NB} = 90(N-1)/(k-1)N + (2k-N-1)*(\Delta\varphi)/2(k-1)N \quad (2)$$

$$\varphi_{LO,NB,NB+1} - \varphi_{LO,NB,NB} = -90/(k-1)N + (2k-1)*(\Delta\varphi)/2(k-1)N \quad (3),$$

where $k=2-x$, and $x=\text{floor}((N+1)/2)=(N+1)/2$, $N \in$ odd, or $N/2$, $N \in$ even.

Therefore, the desired RF transmitter signals radiated by the antenna can be combined in the space after passing through the SPDT switch 310, the beams of the RF transmitter signals are guided along the target direction by controlling $\Delta\varphi$, and meanwhile, the spurs are eliminated perfectly in the space as a result of out-phase of the spurs between the channels of the two adjacent sub-circuits. Apparently, the transceiver in the phased-array system provided by the present invention can execute a desired phased-array function and inhibit the undesired spurs as well. In addition, high frequency carrier signals can be generated by low frequency IF and LO signals, so that design of the transceiver is simplified greatly. The phase resolution of the low frequency phase shifter is not hence reduced in the frequency multiplying process.

In the embodiment, when the transceiver 2 is in the receiver mode, the millimeter wave up-conversion circuit 21 stops receiving the BB transmitter signals and the frequency multiplier 211 of the millimeter wave up-conversion circuit 21 performs up-conversion on the LO input signal to the IF LO signal. The power divider/combiner circuit 22 is used to divide the IF LO signal into a plurality of pairs of IF LO differential signals and to combine a plurality of pairs of BB receiver differential signals into a BB receiver signal. Each of sub-circuits 30 in the beamforming circuit 23 respectively converts the plurality of RF receiver signals such as $RF_{in,1,1}$ and $RF_{in,NB,NB}$ into the plurality of pairs of BB receiver differential signals such as $BB_{I+,1,1}$, $BB_{I-,1,1}$, $BB_{Q+,1,1}$, $BB_{Q-,1,1}$, $BB_{I+,NB, NB}$, $B_{BI-, NB, NB}$, $BB_{Q+,NB, NB}$ and $BB_{Q-, NB, NB}$.

In the embodiment, when the transceiver 2 is in the receiver mode, the LO signal phase-shifting circuit 302 of each of the sub-circuits 30 is used to phase-shift a pair of IF LO differential signals so as to output a pair of signals. The pair of third mixed circuits 3030 in the mixed up-conversion circuit 303 in each of the sub-circuits 30 is used for mixing, the pair of phase-shifting circuits 3031 in the mixed up-conversion circuit 303 in each of the sub-circuits 30 is used for phase-shifting, and the pair of frequency multiplying circuits 3032 in the mixed up-conversion circuit 303 in each of the sub-circuits 30 is used for up-conversion to convert the pair of signals output by the LO signal phase-shifting circuit 302 so as to output a pair of common-mode signals. The second mixed circuit 305 of each of the sub-circuits 30 is used to add the pair of common-mode signals output by the mixed up-conversion circuit 303 so as to output a pair of signals. The 90-degree mixed coupled circuit 306 of each of the sub-circuits 30 is used to convert the pair of signals output by the second mixed circuit 305 into a pair of orthogonal LO signals. The pair of in-phase/quadrature-phase mixed circuits 307 of each of the sub-circuits 30 is used to convert an RF receiver signal into a pair of BB receiver differential signals via the pair of orthogonal LO signals output by the 90-degree mixed coupled circuit 306. The low noise amplifier 309 of each of the sub-circuits 30 is used to amplify the RF receiver signal. The SPDT switch 310 of each of the sub-circuits 30 is used to be switched to the receiver mode by way of TDD so as to receive the RF receiver signal via the antenna 311.

When the plurality of transceivers 2 in the scalable phased-array system 1 in the present invention are taken as receivers, the signal received from the target direction can be processed by the phase-shifting LO signal. As shown in FIG. 2, the RF receiver signal received by the antenna 311 is fed into the pair of in-phase/quadrature-phase mixed circuits 307 via the SPDT switch 310. As the transceivers 2 separate transmission and reception by TDD, the transmitter and the receivers work in different times. The phase-shifting LO signal required by down conversion can be generated by using the transmitter circuit again. By taking the sub-circuit (1, 1) 30 as an example, the pair of frequency multiplying circuits 3032 then generates a common-mode signal $A^N_{LO} CG_{FM} e^{jN(\varphi LO,1,1+\varphi T,1,1)}$ with a frequency of $Nf_{LO}$ and a phase of N ($\varphi$LO,1,1+$\varphi$T,1,1). The pair of common-mode signals is combined and t generate the desired orthogonal LO signal for the receiver via a 90-degree mixed coupled circuit 306. In addition, the phase N($\varphi$LO,1,1+$\varphi$T,1,1) of the LO signal can be adjusted via the LO signal phase-shifting circuit $\varphi_{LO}$302 and the pair of phase-shifting circuits $\varphi_T$3031. The phase resolution of the low frequency phase shifter is not hence reduced in the down-conversion process. Therefore, the receiver in the phased-array system provided by the present invention can execute the desired phased-array function. Then, the RF receiver signal $RF_{in,NB,NB}$ is down-converted by using the pair of phase-shifting LO signals so as to generate the pair of BB receiver differential signals $BB_{in,NB,NB}$ and $BB_{Q,NB,NB}$. The pair of BB receiver differential signals $BB_{I,NB,NB}$ and $BB_{Q,NB,NB}$ from the channels of each of the sub-circuits 30 is combined together via the power divider/combiner circuit 22 and is fed into the millimeter wave up-conversion circuit 21 so as to generate BB receiver signals $BB_{RXI,NS,NS}$ and $BB_{RXQ,NS,NS}$. Finally, the BB receiver signals $BB_{RXI,NS,NS}$ and $BB_{RXQ,NS,NS}$ from each of transceivers 2 of the phased-array system are added via a carrier power combiner circuit to obtain a sum of the BB receiver signals $BB_{RXI}$ and $BB_{RXQ}$.

Figure 4:
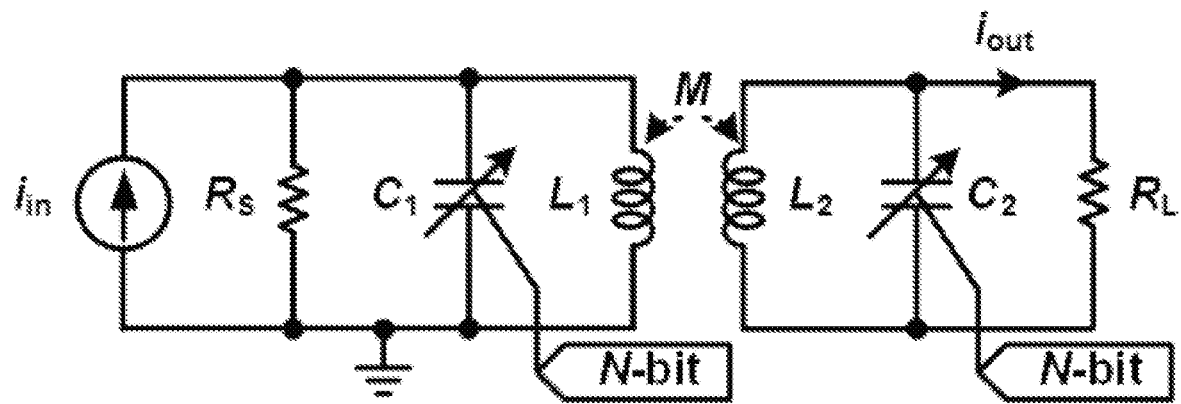
FIG. 4 is a schematic diagram of a phase-shifting circuit provided by an embodiment of the present invention.
Figure 5:
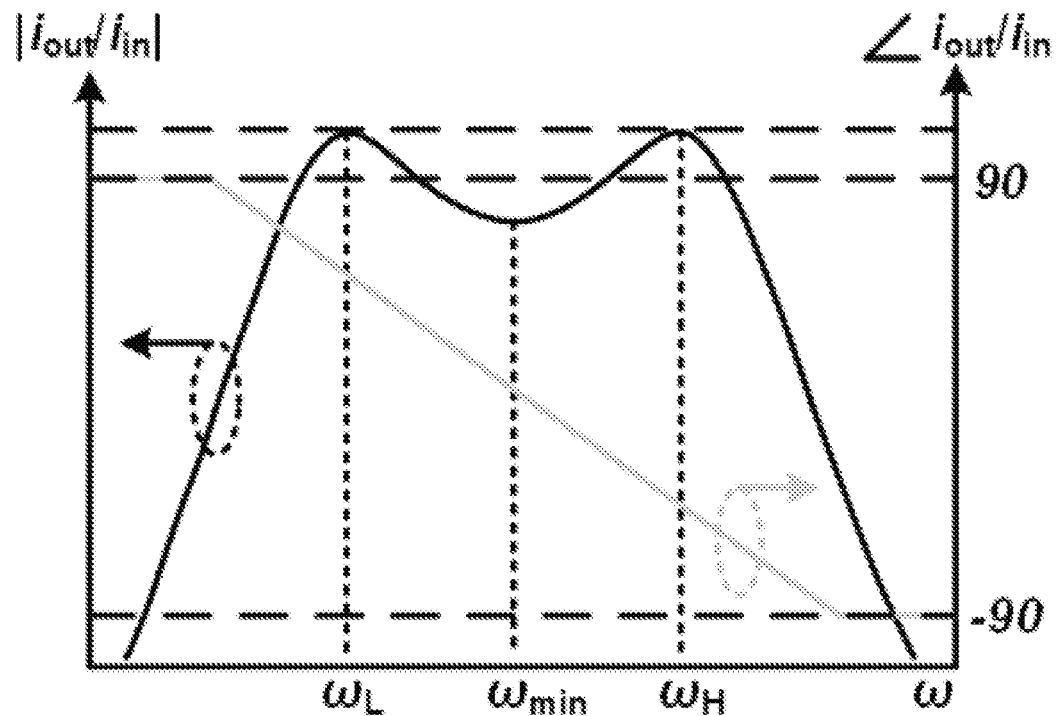
FIG. 5 is a schematic diagram of a frequency response of a phase-shifting circuit provided by an embodiment of the present invention.

In the embodiment, the IF signal phase-shifting circuit 301, the LO signal phase-shifting circuit 302 and the phase-shifting circuit pairs 3031 can be of a resonator-coupled network (RCN) architecture, as shown in FIG. 4. The frequency response thereof is as shown in FIG. 5. It can be noted that there is a frequency range with a relatively flat gain between the resonant frequencies $\omega_L$ and $\omega_H$ of the RCN. Furthermore, phase change in the frequency range is nearly linear. Therefore, the resonant frequencies of the RCN can be adjusted with variable capacitances of $C_1$ and $C_2$ in a digital manner so as to adjust the phase of the input signal, showing a low gain change as well. A design flow of the provided phase shifter is below.

1. Respectively given resistance of source ($R_S$) and resistance of load ($R_L$), system characteristic admittance $y_0$, and quality factor Q, center frequency $\omega_0$ and phase adjusting range $\Delta\theta$ of the resonator can be determined according to required specifications.
2. Numerical values of $C_1$, $C_2$ and k can be determined by equations (4) and (6).
3. $L_1$ and $L_2$ can be calculated by an equation (5).
4. The resonant frequencies of $\omega_L$ and $\omega_H$ can be calculated by equations (7) and (8).
5. At the resonant frequencies of $\omega_L$ and $\omega_H$, the desired minimum capacitance values $C_{1L}$ and $C_{2L}$ and the desired maximum capacitance values $C_{1H}$ and $C_{2H}$ are found respectively.
6. The desired phase shift is obtained by adjusting the variable capacitance between $C_{1L}/C_{2L}$ and $C_{1H}/C_{2H}$.

$$Q = R_S C_1 \omega_0 = R_L C_2 \omega_0 \qquad (4)$$

$$\omega_0 = 1/\sqrt{L_1 C_1 (1-k^2)} = 1/\sqrt{L_2 C_2 (1-k^2)} \qquad (5)$$

$$\Delta\theta = \theta_{\omega_L} - \theta_{\omega_H} \qquad (6)$$

$$= \tan^{-1}[x(k/\sqrt{(1-k))}] + \tan^{-1}[x(k/\sqrt{(1+k))}]$$

$$\omega_L = \omega_0 \sqrt{(1-k)} \qquad (7)$$

$$\omega_H = \omega_0 \sqrt{(1+k)}, \qquad (8)$$

where $x = (Q/y_0) * ((R_S + R_L)/R_S R_L)$, $k = M/\sqrt{L_1 L_2}$.

Figure 6:
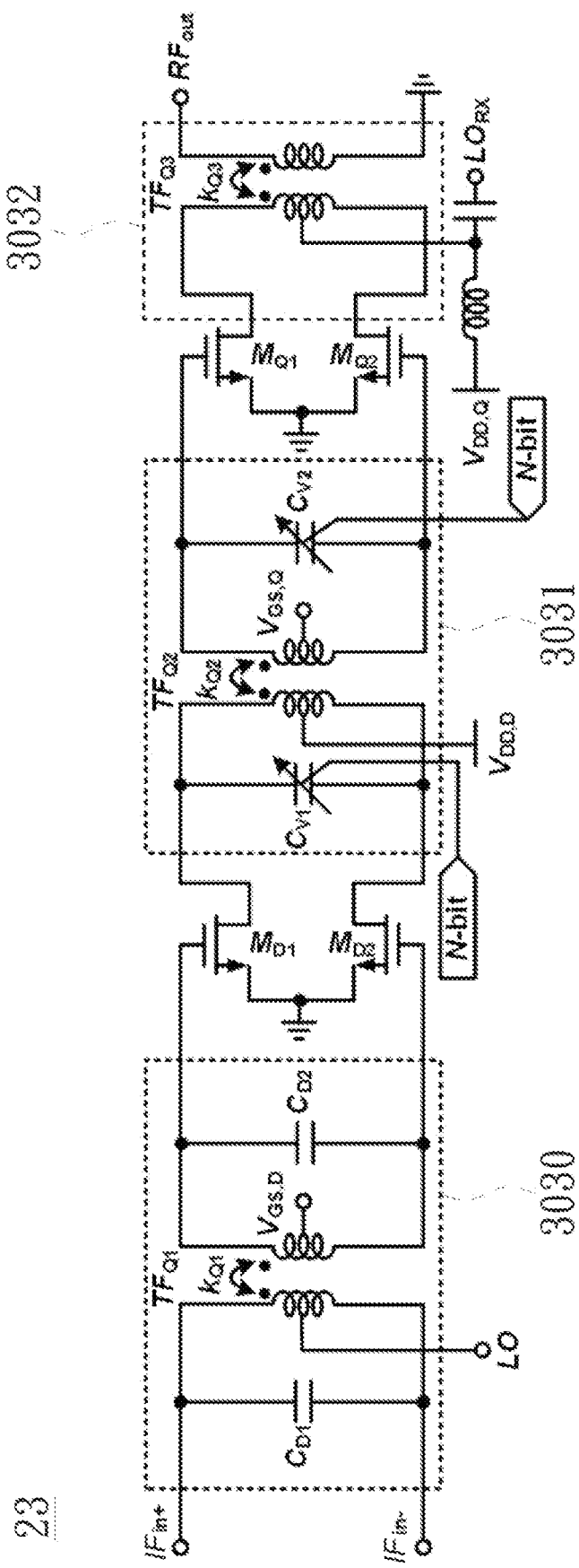
FIG. 6 is a schematic diagram of a mixed up-conversion circuit provided by an embodiment of the present invention.

The resonator-coupled network provided by the present invention can further be used to combine the LO and IF signals and subtract and combine output of the frequency multiplier so as to generate the RF transmitter signal $RF_{out}$ and the LO signal respectively. Furthermore, it further can provide functions of balance-unbalance conversion and impedance matching simultaneously. A quadrupler as shown in FIG. 6 realizes functions of phase shifting, balance-unbalance conversion, impedance matching, signal combination, and subtraction and frequency-multiplying by using a single circuit. As the LO signal is the common-mode signal in the phased-array system provided herein, it inputs into a center tap of the resonator-coupled network to be combined with the IF signal. The interstage phase shifter is of the provided resonator-coupled network architecture, which not only provides a desired phase-shifting function, but also performs interstage impedance matching as well. Outputs of the frequency multiplier are subtracted to obtain the RF transmitter signal $RF_{out}$ and are combined to generate the LO signal for down-conversion of the receiver.

In conclusion, the present invention provides a scalable phased-array system for a wireless system by TDD. The provided architecture realizes the phased-array system by means of a frequency multiplier and a low frequency phase shifter. With respect to design of a transmitter (TX), the provided frequency multiplier has frequency multiplying and mixing functions and is used to perform linear up-conversion on a baseband signal to a desired frequency band. High frequency carriers can be generated by low frequency IF and LO signals, so that design of a transceiver is simplified greatly. Phases of the desired signals and phases of the undesired spurs of each TX element can be respectively controlled by the low frequency phase shifter, and the phase resolution of the phase shifter can be kept unvaried in the up-conversion process. Therefore, output power of the desired signals from each TX element can be combined in a space and beams can be output along a target direction. Meanwhile, the undesired spurs are eliminated correspondingly. With respect to design of a receiver (RX), it is of an LO phase-shifting architecture. The desired LO signals with phase adjusting capacity are directly provided by a transmitter circuit. Thus, the phase of each RX of the phased-array system can be adjusted to receive signals from the target direction. Besides the provided innovated phased-array system, the present invention further provides a multifunctional resonator-coupled network (RCN). The RCN can realize functions of phase shifting, impedance matching, conversion between balance and imbalance, signal combination and subtraction and the like. The area of the transceiver is saved, and the power consumption is reduced greatly.

Although the present invention has been described in the above with the embodiments, the present invention is not limited to those. Those skilled in the prior art shall make few changes and modifications without departing the spirit and scope of the present invention. Therefore, the protection scope of the present invention shall be subject to the protection scope in claims.

The invention claimed is:

1. A scalable phased-array system for a wireless system, comprising:
    a plurality of transceivers, arranged in an array way and switched to form a transmitter mode and a receiver mode by means of time division duplexing (TDD), wherein each transceiver comprises:
    a millimeter wave (mmWave) up-conversion circuit used to convert a baseband (BB) transmitter signal into an intermediate frequency (IF) transmitter signal;
    a power divider/combiner circuit, connected with the millimeter wave up-conversion circuit and used to divide the IF transmitter signal into a plurality of pairs of IF transmitter differential signals in the transmitter mode, and to combine a plurality of pairs of BB receiver differential signals into a BB receiver signal in the receiver mode; and
    a beamforming circuit, connected with the power divider/combiner circuit and comprising a plurality of sub-circuits arranged in an array way, the sub-circuits being used to convert the plurality of pairs of IF transmitter differential signals into a plurality of radio frequency (RF) transmitter signals in the transmitter mode and convert a plurality of RF receiver signals into the plurality of pairs of BB receiver differential signals in the receiver mode.

2. The scalable phased-array system for a wireless system according to claim 1, wherein each of the sub circuits comprises:
    an IF signal phase-shifting circuit used to phase-shift a pair of IF transmitter differential signals in the transmitter mode so as to output a pair of signals;
    a local oscillation signal phase-shifting circuit used to phase-shift a pair of IF local oscillation differential signals in the transmitter mode and the receiver mode so as to output a pair of signals;
    a mixed up-conversion circuit, connected with the IF signal phase-shifting circuit and the local oscillation signal phase-shifting circuit, used to perform up-conversion, phase-shifting and mixing on the pair of signals output by the IF signal phase-shifting circuit and the pair of signals output by the local oscillation signal phase-shifting circuit in the transmitter mode so as to output a pair of signals, and used to perform up-conversion, phase-shifting and conversion on the pair of signals output by the local oscillation signal phase-shifting circuit as a pair of common-mode signals in the receiver mode;

a first mixed circuit, connected with the mixed up-conversion circuit and used to subtract the pair of signals output by the mixed up-conversion circuit in the transmitter mode so as to generate a radio frequency transmitter signal;

a second mixed circuit, connected with the mixed up-conversion circuit and used to add the pair of common-mode signals output by the mixed up-conversion circuit in the receiver mode so as to output a pair of signals;

a 90-degree mixed coupled circuit, connected with the second mixed circuit and used to convert the pair of signals output by the second mixed circuit as a pair of orthogonal local oscillation signals in the receiver mode; and a pair of in-phase/quadrature-phase mixed circuits, connected with the 90-degree mixed coupled circuit and used to convert a radio frequency receiver signal into a pair of baseband receiver differential signals via the pair of orthogonal local oscillation signals in the receiver mode.

3. The scalable phased-array system for a wireless system according to claim 2, wherein the pair of IF local oscillation differential signals is generated by dividing an IF local oscillation signal by the power divider/combiner circuit, and the IF local oscillation signal is generated by performing up-conversion on a local oscillation input signal by the millimeter wave up-conversion circuit.

4. The scalable phased-array system for a wireless system according to claim 2, wherein the pair of IF local oscillation differential signals is generated by the power divider/combiner circuit.

5. The scalable phased-array system for a wireless system according to claim 2, wherein the pair of IF local oscillation differential signals is generated by a synthesizer.

6. The scalable phased-array system for a wireless system according to claim 2, wherein each of the sub-circuits further comprises:

an antenna;

a Single-Pole Double-Throw switch, connected with the antenna and used to be switched to form the transmitter mode that transmits the RF transmitter signal via the antenna and the receiver mode that receives the RF receiver signal via the antenna by means of TDD;

a power amplifier, connected with the first mixed circuit and the Single-Pole Double-Throw switch and used to amplify the RF transmitter signal; and a low noise amplifier, connected with the pair of in-phase/quadrature-phase mixed circuits and the Single-Pole Double-Throw switch and used to amplify the RF receiver signal.

7. The scalable phased-array system for a wireless system according to claim 2, wherein the mixed up-conversion circuit comprises:

a third pair of mixed circuits, connected with the IF signal phase-shifting circuit and the local oscillation signal phase-shifting circuit;

a pair of phase-shifting circuits, connected with the third pair of mixed circuits; and a pair of frequency multiplying circuits, connected with the pair of phase-shifting circuits.

8. The scalable phased-array system for a wireless system according to claim 7, wherein the IF signal phase-shifting circuit, the local oscillation signal phase-shifting circuit and the pair of phase-shifting circuits are of a resonator-coupled network structure.

9. The scalable phased-array system for a wireless system according to claim 1, wherein the BB transmitter signal comprises a pair of in-phase/quadrature-phase BB transmitter signals.

10. The scalable phased-array system for a wireless system according to claim 3, wherein the millimeter wave up-conversion circuit comprises a frequency multiplier used to perform up-conversion on the BB transmitter signal into the IF transmitter signal and to perform up-conversion on the local oscillation input signal into the IF local oscillation signal.

* * * * *